United States Patent
Matono et al.

(10) Patent No.: US 8,665,680 B2
(45) Date of Patent: Mar. 4, 2014

(54) RECORDING/REPRODUCING APPARATUS

(75) Inventors: Haruki Matono, Fujisawa (JP);
Toshihiro Kato, Tokyo (JP); Shimpei Usui, Yokohama (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 525 days.

(21) Appl. No.: 12/949,839

(22) Filed: Nov. 19, 2010

(65) Prior Publication Data

US 2011/0131575 A1 Jun. 2, 2011

(30) Foreign Application Priority Data

Nov. 30, 2009 (JP) ................................ 2009-270982

(51) Int. Cl.
*G11B 7/00* (2006.01)
(52) U.S. Cl.
USPC ............ 369/84; 369/47.12; 369/53.21; 718/1
(58) Field of Classification Search
USPC ......... 369/47.12, 84, 69, 30.05, 30.19, 53.21, 369/85; 718/1
See application file for complete search history.

(56) References Cited

U.S. PATENT DOCUMENTS

| | | | |
|---|---|---|---|
| 6,693,869 B1 * | 2/2004 | Ballantyne | 369/84 |
| 8,199,622 B2 * | 6/2012 | Yang et al. | 369/53.2 |
| 2003/0221083 A1 * | 11/2003 | Hill et al. | 711/207 |
| 2005/0027753 A1 * | 2/2005 | Akama et al. | 707/200 |
| 2005/0201266 A1 * | 9/2005 | Sun | 369/292 |
| 2007/0220313 A1 * | 9/2007 | Katsuragi et al. | 714/6 |
| 2010/0257034 A1 * | 10/2010 | Yang et al. | 705/14.4 |

FOREIGN PATENT DOCUMENTS

| | | |
|---|---|---|
| JP | 2004-046750 | 2/2004 |
| WO | WO 2009/017289 A1 | 2/2009 |

OTHER PUBLICATIONS

Kabushiki-Kaisha Ark Information System Press Release data of sale May 22, 2009 CD Revolution/Virtual Ver. 11, Retrieved from http://ark-info-sys.co.jp/presss/cdv11/index.html.
Office Action, mailed May 9, 2013, issued by the Patent Office of The People's Replublic of China (PRC) in corresponding PRC Appln. No. 201010563230.0.

* cited by examiner

*Primary Examiner* — Thomas Alunkal
(74) *Attorney, Agent, or Firm* — Antonelli, Terry, Stout & Kraus, LLP.

(57) ABSTRACT

A recording/reproducing apparatus, for producing a virtual disc independent upon a host PC, and for managing virtual discs with an easy operation, comprises a CPU 100, a memory 101, a storage I/F 102, an external I/F 103, a device portion (DP) controller portion 201, a virtual device portion (VDP) controller portion 202, a virtual serial ATA 601, a virtual ATAIP 602, and at least two (2) or more numbers of recording/reproducing apparatuses, wherein it is notices to a HOST PC that a device is connected to the device portion when a virtual disc is produced, and the virtual disc is cut off and also information corresponding thereto is deleted when taking out or an order of taking out is made from the HOST PC.

9 Claims, 7 Drawing Sheets

| VDP# | HDD OFFSET | SIZE | STATUS |
|---|---|---|---|
| 3 | 0x0800000000 | 0x800000000 | Virtual ON |
| 4 | 0x1000000000 | 0x800000000 | Virtual ON |
| 5 | 0x1800000000 | 0x800000000 | Virtual ON |
| 6 | 0x2000000000 | 0x800000000 | Imaging |
| 7 | 0x0000000000 | 0x0 | None |

RECORDING/REPRODUCING APPARATUS

This application relates to and claims priority from Japanese Patent Application No. 2009-270982 filed on Nov. 30, 2009, the entire disclosure of which is incorporated herein by reference.

BACKGROUND OF THE INVENTION

The present invention relates to a recording/reproducing apparatus, and it relates to, in particular, a controlling method of the recording/reproducing apparatus loading or mounting plural numbers of devices thereon.

As a background art of the corresponding technical field is already known, for example, the following Patent Document 1.

In the following Patent Document 1 is described, as the problem(s) to be dissolved, "for reproducing a virtual optical disc, it is necessary to provide a drive, similar to the case of an actual disc, and this drive is provided in a memory device as a virtual drive. However, conventionally, this virtual drive must be produced upon setup made by a user, and it takes a lot of time or works, therefore bringing about a large burden for the user who is not familiar with.", and also is described, as a means for dissolving, "An optical system, according to the present invention, comprises a host apparatus, and an optical disc drive for reading out and producing information recorded on an optical disc, which is connected with the host apparatus. In the host apparatus, all of information recorded on each of plural numbers of discs is read out by the optical disc drive, and is stored in a memory means for each disc. And, one (1) set of virtual drive is automatically produced for the information read out from one (1) piece of optical disc, so that the host can recognize that one (1) set of virtual drive as a disc drive unit. With doing so, when inserting plural number of optical discs into the drive, one by one, the information of each disc is read into the memory means, and at the same time, the virtual drive is produced for each disc, and then the virtual drive produced can be recognized one (1) set of disc drive unit by the host apparatus. With this virtual drive, it is possible to reproduce the information stored in the memory means, and there can be achieved a changer function by selecting the plural number of virtual drives. And, according to the present invention, since the virtual drive can be set up by setting the disc, only, i.e., there is no necessity of producing the virtual drive on a user's side, then the burden of works can be reduced. And also, the information of the optical disc is stored or piled up on the side of the host apparatus, then there is no deed of the memory device having large memory capacity on the drive side, and the optical disc drive can avoid from large-sizing thereof."

Also, in the following Non-Patent Document 1, there is described "is a software for producing a virtual drive and a virtual CD within a hard disk" and "the virtual drive is a drive, which is recognized as "CD drive" on Window®, in spite of not being a CD drive actually mounted, and can be used in the similar manner to the CD drive actually mounted thereon.", and as an effected, there is described "Once reading it therein from by using "CD revolution/Virtual", there is no necessity of an actual CD/DVD or a CD drive." and "Since it can be read into, directly, from a hard disk, an access speed can be increased, greatly, comparing to the actual CD/DVD."

PRIOR ART DOCUMENTS

Patent Documents

[Patent Document 1] Japanese Patent Laying-Open No. 2004-46750 (2004).

Non-Patent Documents

[Non-Patent Document 1] Kabushiki-Kaisha Ark Information System Press Release data of sale May 22 (Fri) 2009 CD Revolution/Virtual Ver. 11, http://ark-info-sys.co.jp/presss/cdv11/index.html.

BRIEF SUMMARY OF THE INVENTION

In the Patent Document 1 mentioned above, though recording is made on the hard disk with treating the optical disc as the virtual drive, however since no consideration was paid on an operation, such as, deletion of the virtual disc, it is necessary to use it with consciousness that it is the virtual drive, and the operations thereof are complicated.

Also, in the Non-Patent Document 1 mentioned above, as notes to be attended when using the Non-Patent Document 1, there is described, "The virtual CD cannot be used by a computer, which does install "CD/Revolution/Virtual" therein", i.e., it is impossible to use the virtual disc if not installing the software in a personal computer (CP). Also, installation and setup are made for each HOST PC, and then the configuration of the virtual disc depends on the HOST PC. Further, it is necessary to utilize the software for exclusive use, and then a user must learn or memorize new operations.

Then, according to the present invention, within a recording/reproducing apparatus, being connectable with plural numbers of devices, there is provided a means for controlling as if a physical disc is connected with, when producing a virtual disc, and controlling as if the virtual disc is cut off, when an operation for cutting off or taking out of the drive is made by a user, and at the same time, deleting image data corresponding thereto. Also, it has a means for connecting with a medium for exclusive use of reading when virtualization thereof, even if the medium to be virtualized is a writable one.

According to the present invention, virtualization can be made independent upon a host PC, and a user can control a disc virtualized with an operation same to the conventional one. Also, with connecting a medium as that for exclusive use of reading, it is possible to avoid an error operation, i.e., the user writes into the virtual medium, erroneously, and thereby enabling to buildup a virtual drive with a simple configuration, since there is no need of renewing management information unique to the disc.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Figure 1:
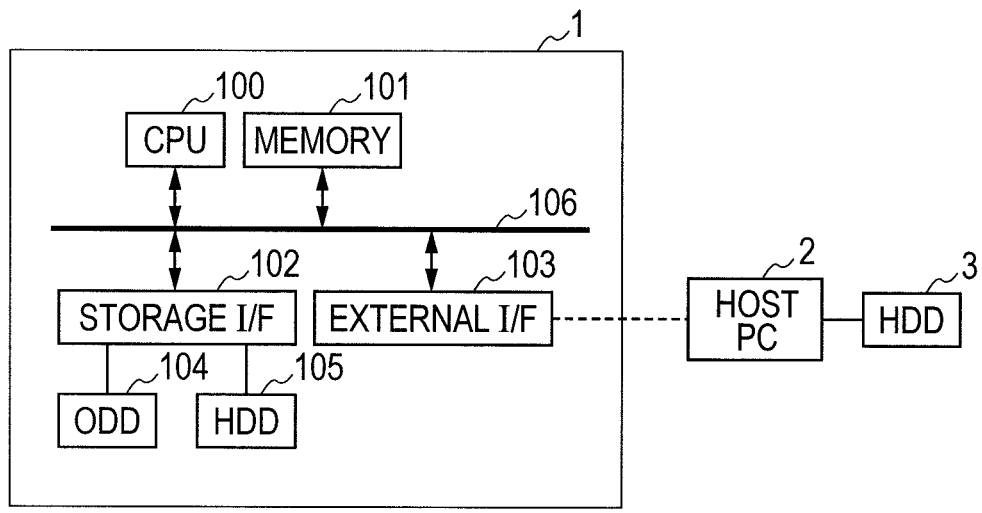
FIG. 1 is a block diagram for explaining the entire structures of a recording/reproducing apparatus, according to an embodiment of the present invention.

First of all, explanation will be made on the structures of a recording/reproducing apparatus, according to the present invention, by referring to FIG. 1. This FIG. 1 is a block diagram for explaining about the entire structures of the recording/reproducing apparatus, according to the present invention.

The recording/reproducing apparatus 1 is an apparatus to be connected with a HOST PC 2, thereby executing reading/writing of information. Within the recording/reproducing apparatus 1, a CPU (Central Processing Unit) 100, a memory 101, a storage I/F 102 and an external I/F 103 are connected with each other through an internal bus 106. To the storage I/F 102 are connected an ODD (Optical Disc Drive) 104 and a HDD (Hard Disk Drive) 105. The recording/reproducing apparatus 1 is connected with a HOST PC 2 through the external I/F 103.

The HOST PC 2 has the HDD 3 built-in, storing a start-up file of OS of the HOST PC 2, etc., thereon. Herein, according to the present embodiment, there may be cases of calling a HHD 3 built in the HOST PC 2, "LOCAL DISK".

The CPU 100 executes operation controls of the entire operations of the recording/reproducing apparatus 1.

The memory 101 is used as a program area or region and/or a temporary working area or region of the main controller 100.

Figure 2:
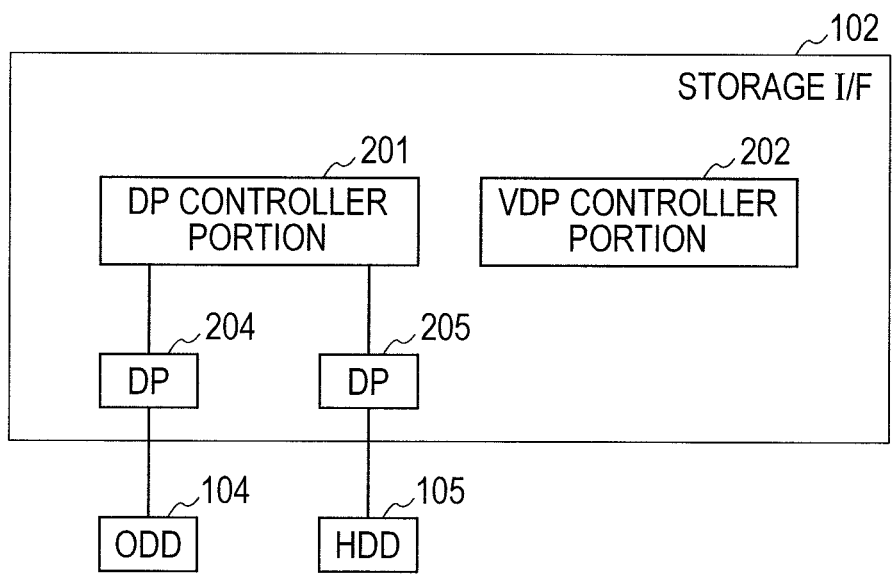
FIG. 2 is a block diagram for explaining a storage I/F.

The storage I/F 102 executes control of a recording medium included in the recording/reproducing apparatus 1, and makes a response to a request of reading/writing from the external I/F 103. The structures of the storage I/F 102 will be explained by referring to FIG. 2. A DP controller portion 201 controls a device port, and in FIG. 2, it has device ports DP 204 and DP205, for enabling connection of two (2) devices. With the DP 204 is connected the ODD 104, and with the DP 205 is connected the HDD 105. Herein, in the present embodiment, there may be cases of calling the HDD 105, "EXT DISK". The virtual device portion (VDP) controller portion 202, though it is not connected to the physical device portion, but makes a notice to a higher ranked external I/F, as if there is a device port, in cooperation with the DP controller portion 201. Detailed operations of this will be given later. In the present embodiment, although the storage I/F 102 will be explained as a processing block for achieving a port multiplier (PMP) function of the serial ATA standard or regulation, but similar effects can be obtained if it is connected with plural numbers of devices and it exchanges a transmission line or path; therefore, the present invention should not be limited to the serial ATA standard or regulation.

Figure 3:
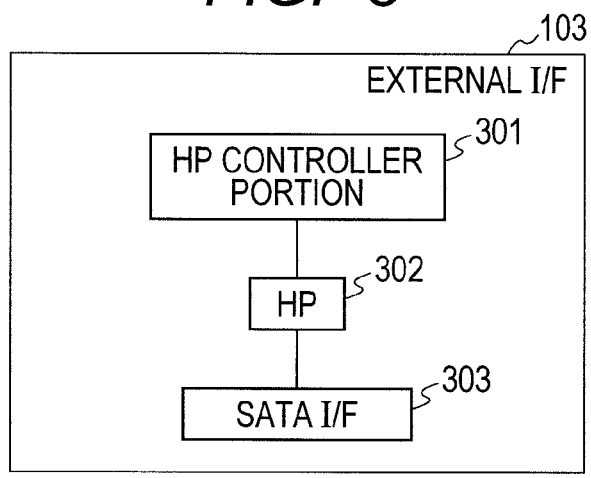
FIG. 3 is a block diagram for explaining an external I/F.

The external I/F 103 controls connections between the storage I/F 102 and the HOST PC 2. The structures of the external I/F 103 will be explained by referring to FIG. 3. The external I/F 103 has a HP controller portion 301 for controlling a host port, a host port HP 302, and a SATA I/F 303 for converting into the serial ATA standard or regulation. The serial ATA standard or regulation includes therein a function, which is called, the port multiplier (PMP), and with this, it is possible to connect plural numbers of devices to one (1) serial ATA port. Herein, it is assumed that a port to be connected to the side of the HOST PC called, "a host port (HP)", and a port, with which the plural numbers of devices should be connected, is called, "a device portion (DP)", respectively.

Figure 4:
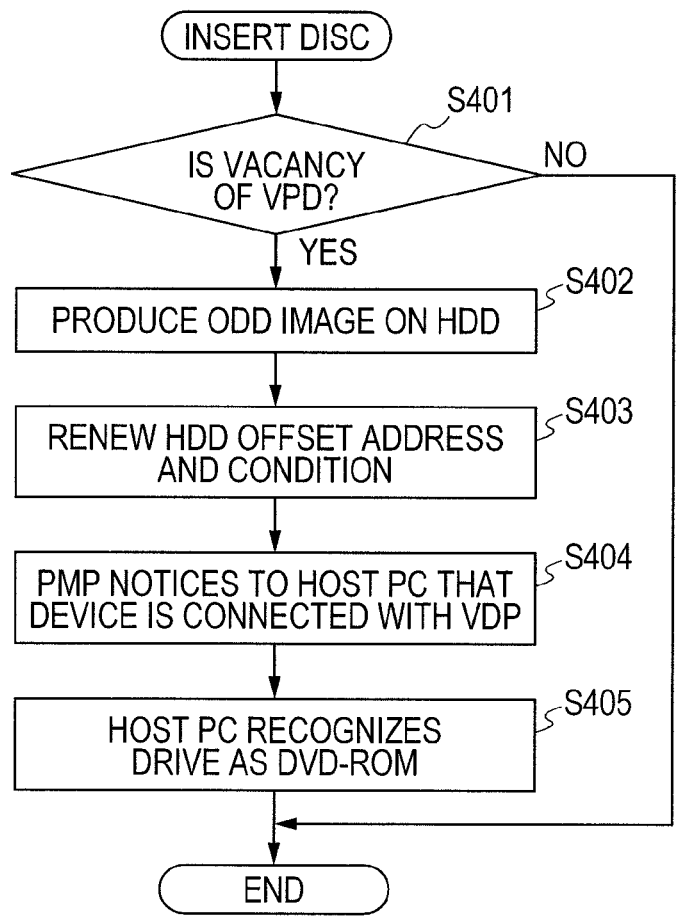
FIG. 4 is a view for showing a flowchart when producing a virtual disc.
Figures 5, 6:
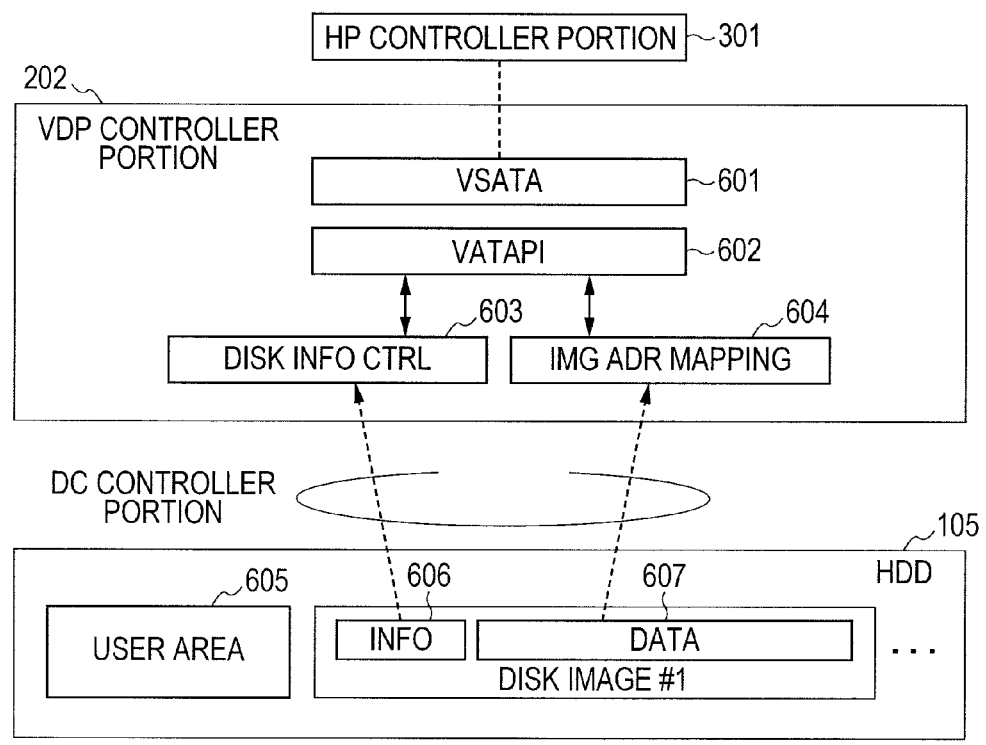
FIG. 5 is a view for showing a HDD address offset table of the virtual disc.
FIG. 6 is a view for explaining a VDP controller portion.
Figure 7:
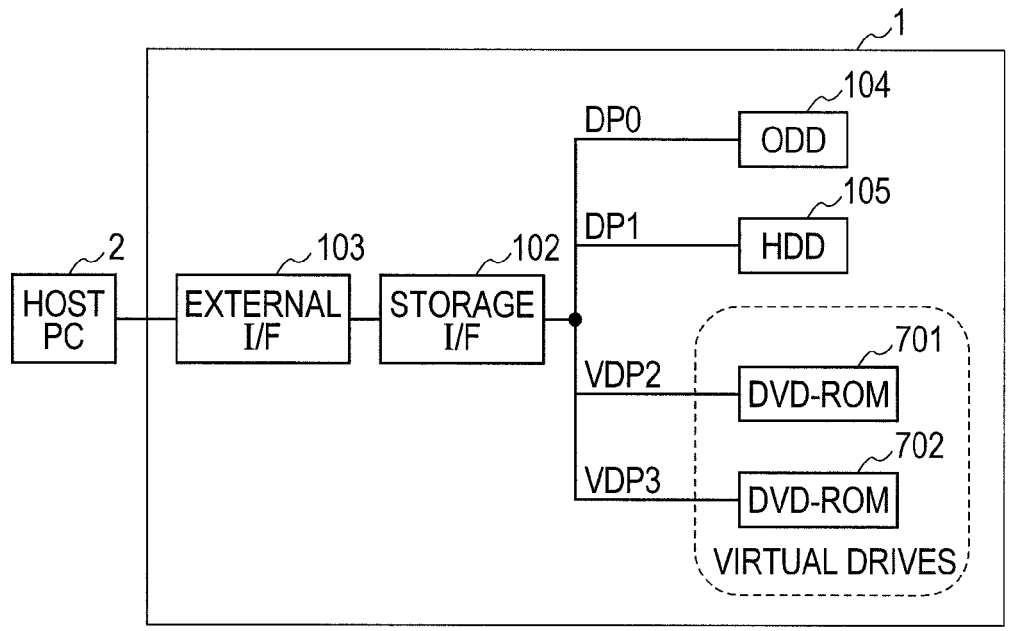
FIG. 7 is a block diagram for showing positioning of a virtual drive and a physical drive.

Next, explanation will be given on the operations when a disc is inserted into the ODD 104, along with the flowchart shown in FIG. 4. First of all, when the disc is inserted into the ODD 104, the CPU 100 confirms the VDP controller portion 202 shown in FIG. 2, if there is a vacancy of VDO or not (S401). If there is a vacancy, information recorded on the optical disc and management information of the optical disc and/or ODD are copied from the ODD 104 to the HDD 105. The management information of ODD is information including condition and/or ID of the disc, on which recording is made, and is information necessary when the VDP controller portion 202 conducts a command response as the virtual ODD later. Those information are recorded on the HDD 105, however the HDD 105 records those in a special area (s) or region (s) thereof, to which access cannot be made from the external I/F 103, for use of the virtual disc. Next, as the management information, the HDD address offset table is renewed (S403). The address offset table has, as is shown in FIG. 5, a virtual port number (VDP#) and a position (HDD OFFSET) written on the HDD 105, a size (SIZE) of the virtual image, and a condition or status (STATUS) of being virtualized or not. As an example of STATUS, status management is conducted in such a manner that it is "Virtual ON" for the VDP, on which the virtualization is completed, and it is "Imaging" when the virtualization is on the way, and it is "None" when the virtualization is not yet done, for example. Next, the PMP notices the fact, that a device is connected to the VDP, to the HOST PC 2 through the external I/F 103 (S404). This is a process for virtually executing the operation, i.e., connecting the device to the DP of the port multiplier, and this can be recognized that a new storage device is connected, to a user operating the HOST PC 2. A relationship between the PD and the VDP in this instance is shown in FIG. 7. This FIG. 7 shows an entire image of the HOST PC 2 and the recording/reproducing apparatus 1, wherein a DVD-ROM 701 and a DVD-ROM 702 look to be connected with the VDP 2 and the VDP 3, which do not exist physically. Herein, with recognition of the virtual drive as a drive of read-only, since no writing will not accessed to the virtual device, there is no necessity of changing the management information of the disc; thereby simplifying the structure thereof.

Next, explanation will be made about the operations when access is made to the device, which is virtualized. As was mentioned above, the recording/reproducing apparatus 1 is an apparatus, to the port multiplier of SATA standard of which are connected plural numbers of devices. When the virtualization is completed, since it is noticed to the HOST PC 2 that a device is virtually connected to a port number, which does not exist physically, then the HOST PC 2 recognizes that there is a device, thereby enabling to access to the virtual device. In this instance, the recording/reproducing apparatus 1 is possible to determine that the access from the HOST PC 2 is directed to the virtual device, from the port number. FIG. 6 shows the details of the VDP controller portion for controlling the virtual device(s), and it is constructed with a VSATA 601 for responding to an ATA command, virtually, a VATAPI 602 for responding to an ATAPI command, virtually, a DISK INFO CTRL 603 for controlling the management information of a disc(s), which is/are reserved, and an IMG ADR MAPPING 604 for converting address, wherein the VSATA 601 and the VATAPI 602 collect information from the DISK INFO CTRL 603 and/or the IMG ADR MAPPING 604, when an access is made from the HP controller portion 301; i.e., responding to that as if the device is connected with. The DISK INFO CTRL 603 reads out the management information of the optical disc, which is produced during when being virtualized, from the region INFO 606 of DISK IMAGE#1 within the HDD 105, and notices it to the VATAPI 602. The IMG ADR MAPPING 604 reads out information by making correspondence between the address, which is designated from the HOST PC 2, and DATA 607 of the DISK IMAGE#1 of the HDD 105. However, in this instance, reference is made to the address offset table shown in FIG. 5, which was mentioned previously.

Also, the DISK INFO CTRL 603 can achieve the above even if an original medium is writable medium, by responding thereto as a disc for exclusive use of reading. Or, it is also possible to take a method of noticing it as an error, or the like, when receiving a write command. With this, it is possible to prevent the user from recording to the virtual device, erroneously, i.e., no writing will be conducted onto the actual device, and other than that, there is no necessity that the IMG ADR MAPPING 604 manages the change made on the INFO 605, and thereby achieving simplification of the structure thereof. For example, even if a DVD-RW disc, i.e., a readable and writable disc is inserted therein and a virtual disc thereof is produced, when it is virtualized, it responds as the DVD-ROM for exclusive use of reading. Herein, a CD-ROM is also for exclusive use of writing; however, it responds as the DVD-ROM, because it is difficult an incompatibility occurs if it is fitted to the standard or regulation, as similar as possible to that.

Figure 8:
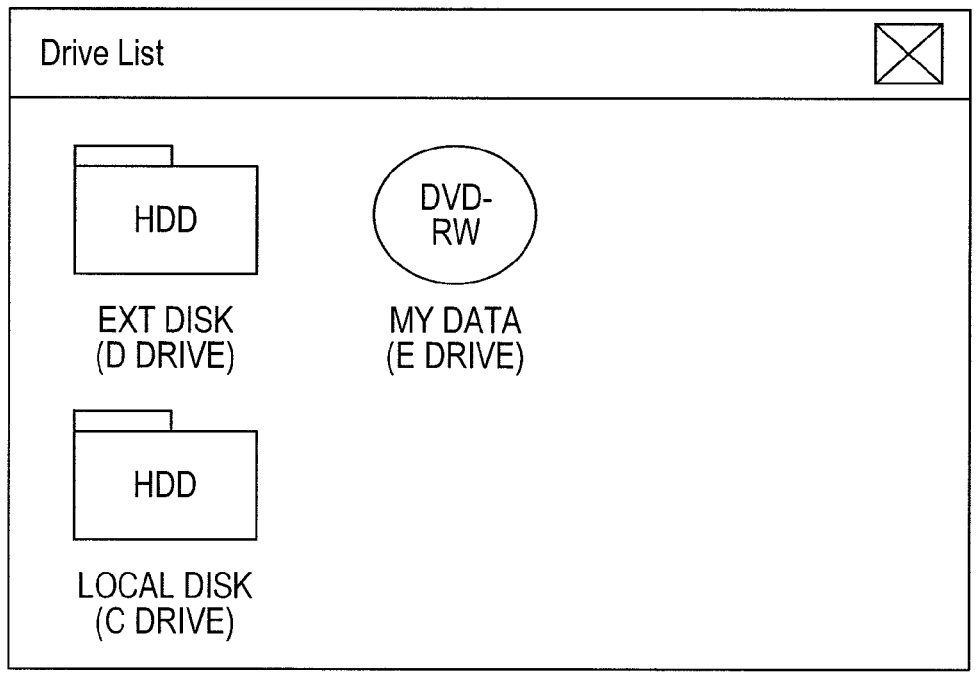
FIG. 8 is a view for showing an example of GUI when no virtual drive exists.
Figure 9:
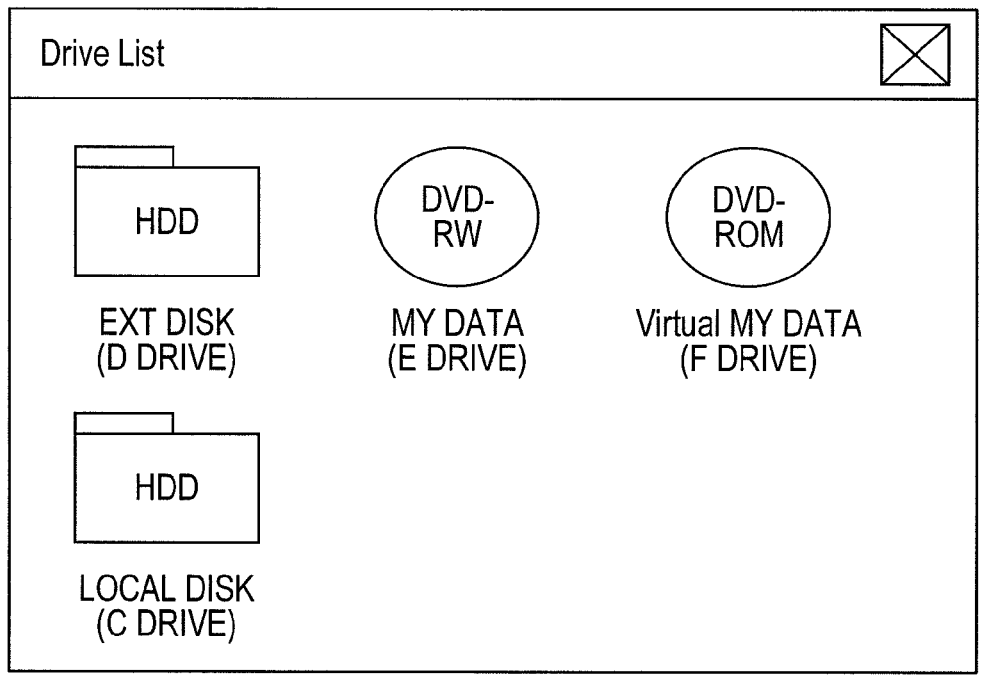
FIG. 9 is a view for showing an example of GUI when the virtual drive is recognized.
Figure 10:
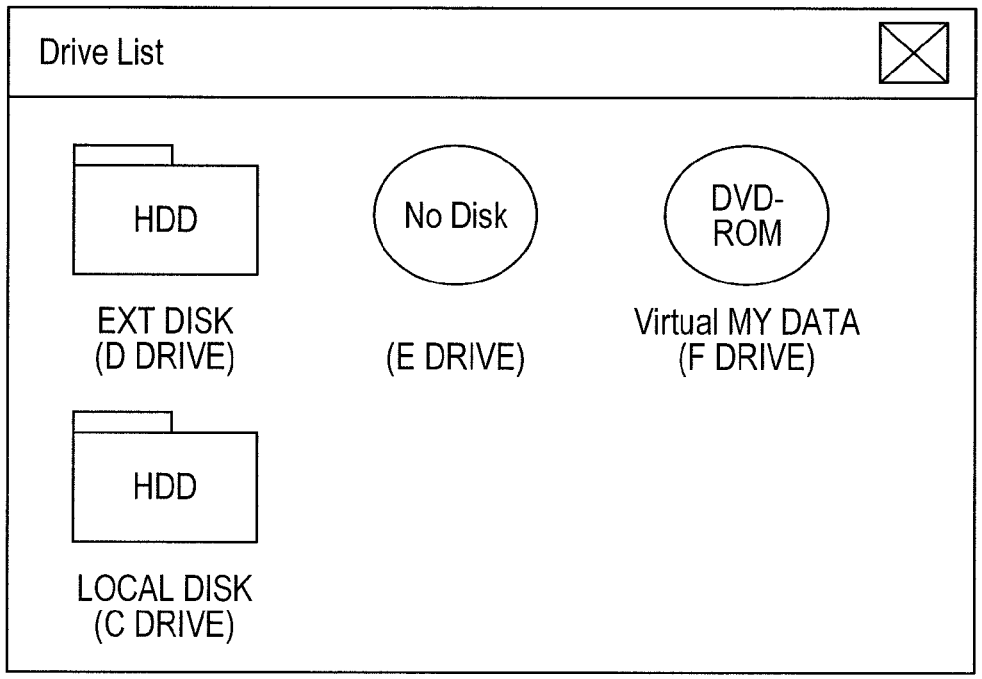
FIG. 10 is a view for showing an example of condition where the virtual drive is recognized even if there is no disc in the physical drive.

Next, explanation will be given on a method for noticing a use when the virtualization is completed, by referring to FIGS. 8 and 9 attached. FIG. 8 shows GUI (Graphical User Interface) on an operating system (OS), which is installed in the HOST PC 2, and it shows, in particular, a list of the recording/reproducing apparatus(es), which is/are connected with. In FIG. 7 is shown the condition that the HDD 3 built within the HOST PC 2 is recognized as a LOCAL DEVICE (C DRIVE), and that the HDD 105 of the recording/reproducing apparatus 1 is recognized as an EXT DISK (D DRIVE). Also, to the ODD 104 of the recording/reproducing apparatus 1 is set a DVD-RW disc, and a volume label thereof is recognized as MY DATA (E DRIVE). Since both of those are the devices physically existing, it is common to display them in this manner. Next, when the virtualization is completed, they are displayed as is shown in FIG. 9. In addition to the devices displayed thereon, a volume label MY DATA as the DVD-ROM is connected at F DRIVE. The F DRIVE is same to the disc, which is inserted into the F DRIVE. In this manner, i.e., with driving the HOST PC 2 to recognize that connection is made with the DP, for the user, it is possible to handle the virtual drive with an operating feeling, same to that when connecting a device to an ESATA (External Serial ATA) or a USB (Universal Serial Bus) of the HOST PC 2, etc. Since, the user can operate without remembering a special operation, and therefore it is useful. Since actual data of the F DRIVE is recorded on the HDD 105, the VDP controller portion 202 respond to a command, such as, reading or writing, or obtaining of disc information, etc., from the HOST PC 2, as if the device is actually connected with. Also, even if an E DRIVE is taken out, since it utilizes the data within the HDD 105, the F DRIVE can be used, continuously, thereafter (FIG. 10). In this manner, since an access can be made thereto even if the disc is not inserted into the ODD 104, then the access can be made without carrying the physical media to a place where she/he moves; therefore it is high in the convenience thereof.

Figure 11:
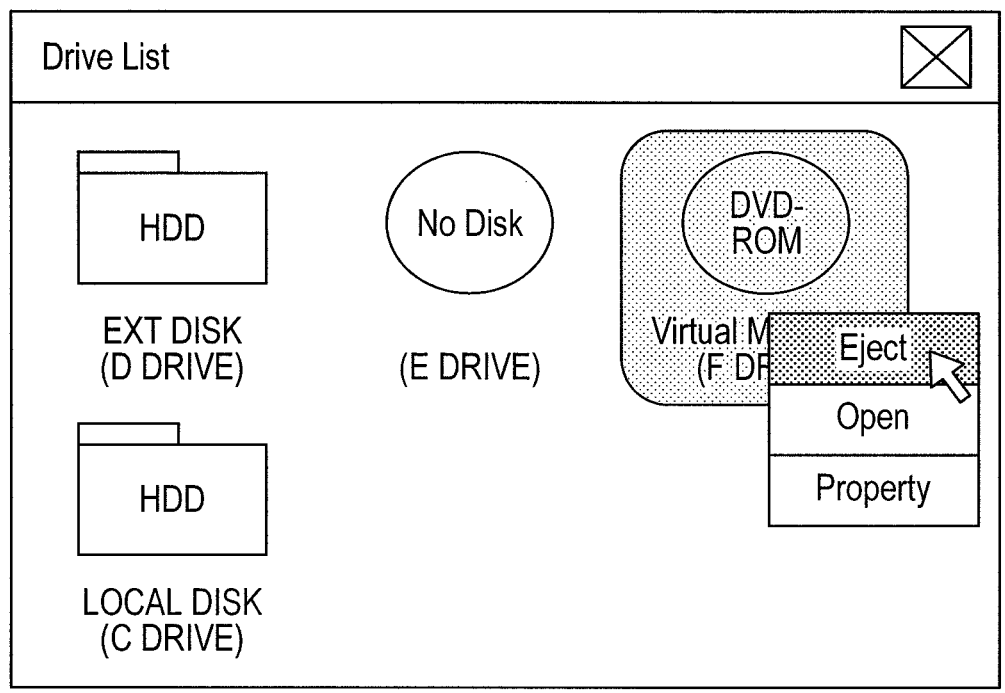
FIG. 11 is a view for showing an example of the GUI when deleting the virtual drive.
Figure 12:
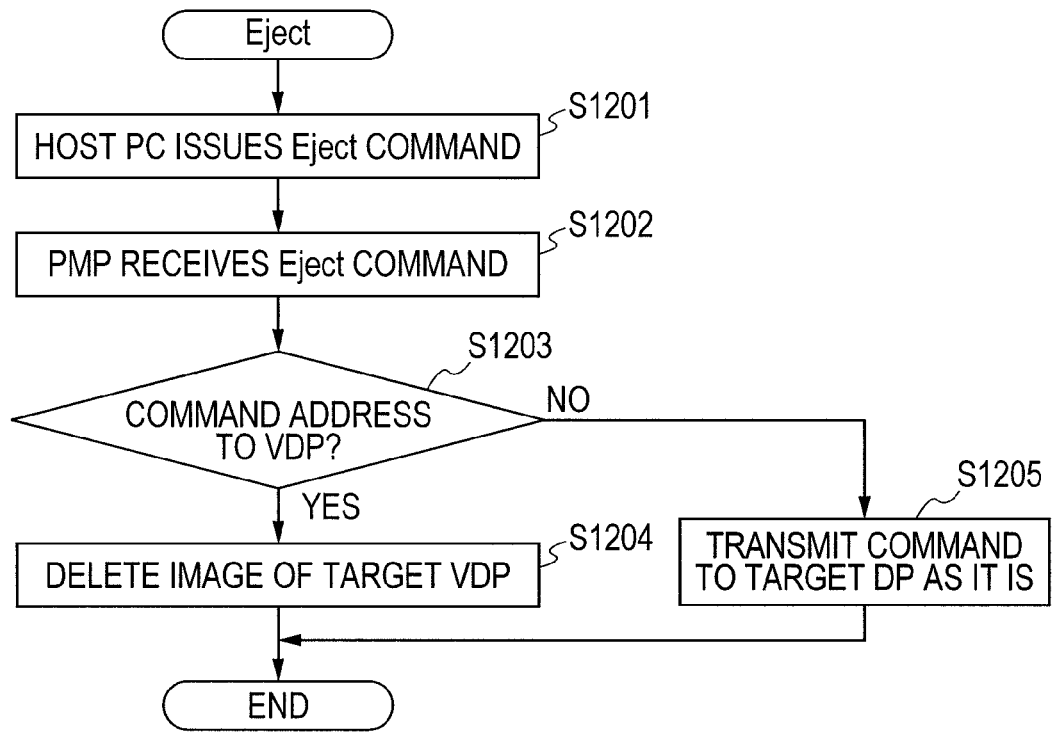
FIG. 12 is a view for showing a flowchart when deleting the virtual drive.

Next, explanation will be made on a method for deleting the disc image (i.e., data corresponding to F DRIVE), by referring to FIGS. 11 and 12. Herein, FIG. 11 shows the GUI screen, on which the user operates when deleting it, and FIG. 12 shows an operation flowchart of the recording/reproducing apparatus 1 after the operation by the user. The virtual drive according to the present invention is recognized by the HOST PC 2 as if it is connected to the DP. Accordingly, the user can delete the virtual drive with the operation, which is not changed from the conventional operation; i.e., taking out the virtual disc by conducting an operation for taking out a disc, and at the same time, deleting the disc image produced. More detailed method of an operation and the performances thereof will be explained, hereinafter.

Firstly, FIG. 11 shows a condition of displaying a list of devices on a screen of the HOST PC 2, wherein the user selects a device, which she/he wishes to delete from, and selects Eject (taking out). Then, the HOST PC 2 issues a command of taking out to the recording/reproducing apparatus 1 (S1201). The PMP of the recording/reproducing apparatus 1 receives the command of taking out (S1202), and if the command of taking out is a one addressing to the VDP (S1203), then an image of the target VDO is deleted by referring to the address offset table shown in FIG. 5 (S1204). If the command is addressed to the device physically existing, then the command is transferred to the target DP as it is (S1205). With the operations mentioned above, it is possible to delete the data for use of VDP of the HDD 105 in accordance with, while keeping the conventional operation, i.e., the user can operate it, easily; thereby increasing the convenience thereof.

In the present embodiment, although the taking out or the command of taking out is related with the deletion; however, it is also possible to use a unique command for exclusive use of deletion (i.e., a vender unique command in accordance with the SATA standard, etc.).

Figure 13:
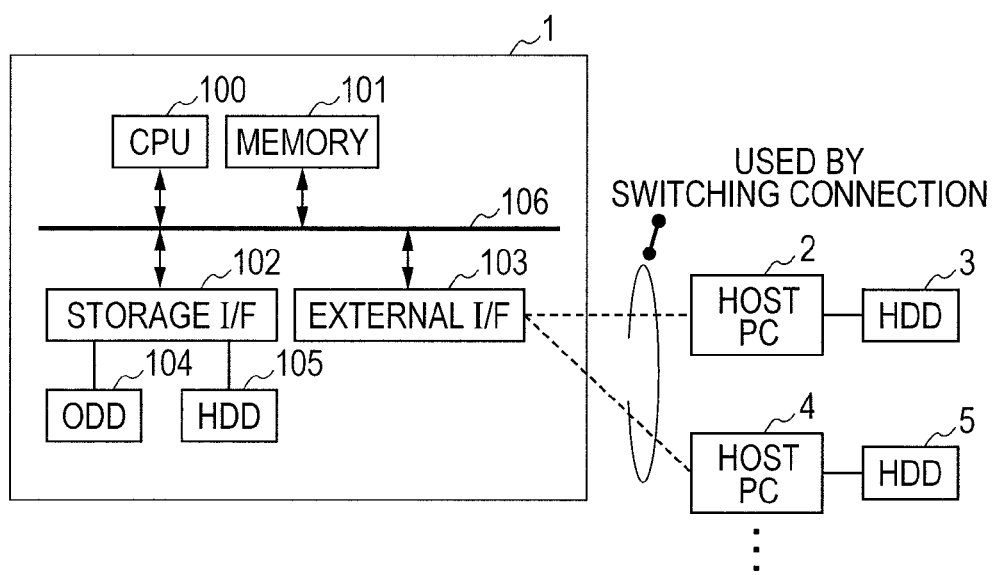
FIG. 13 is a view for showing the structures of the recording/reproducing apparatus, according to the present invention, in particular, when mounting plural numbers of HOST PCs thereon.

Explanation will be given on a case where plural numbers of HOST PCs are connected, by referring to FIG. 13. In this FIG. 13, a HOST PC 4, and a HDD 5 built within HOST PC 4 are added, in addition to those shown in FIG. 1. When changing the connection of the reading/reproducing apparatus 1 to the HOST PC 4 after producing the virtual disc by the HOST PC 2 shown in FIG. 13, the reading/reproducing apparatus 1 notices to the HOST PC 4 through the external I/F 103, that the virtual disc produced by the HOST PC 2 is also connected with. In details of the method of noticing, as was mentioned in the embodiment 1, it is conducted by the method, e.g., the VDP controller portion 202 within the storage I/F 102 controls as if the drive is connected with. In this manner, also the virtual disc, which is produced by separate HOST PC, can be referred by other HOST PC while maintaining the configuration thereof; and this is useful. However, the configuration of the virtual drive can be maintained, in the similar manner, irrespective of a sort or kind of the OS of the HOST PC.

However, the structure of the present invention should not be restricted only to those embodiments mentioned above, but various additions may be made thereto, within a range without departing from the gist of the present invention. For example, the device connected with the storage I/F is also connected with the ODD 104 and the HDD 105, and it transmit the data, which is inserted into the ODD 104, to the HDD 105, thereby noticing to the HOST PC 2 as the virtual drive; however, it may have plural numbers of devices, and the number of the VDP can be increased as far as the standard permits. Also, for example, in the place of the ODD and the HDD, a semiconductor memory or a SSD (Solid State Drive) can be applied, appropriately.

However, the present invention should not be limited to the embodiments mentioned above, but may include various variations thereof. For example, the detailed explanation was given on embodiments mentioned above for easy understanding of the present invention, then the present invention should not be restricted to that having all of the constituent elements explained in the above. Also, a part of the structure of any embodiment can be substituted by the structure of other embodiment, and the structure of other embodiment can be added to the structure of a certain embodiment, etc.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A recording/reproducing apparatus for recording information to plural numbers of devices and for reproducing information from said plural numbers of devices, comprising:
    an external interface portion, which is configured to execute transmission between an external apparatus and the recording/reproducing apparatus;
    a virtual device controller portion, which is configured to notice a part of regions of said plural numbers of devices to said external interface portion as a virtual device; and
    a storage controller portion, which is configured to control transmission of information to said plural numbers of devices,
    wherein at least one device of said plural numbers of devices is an optical disc drive,
    wherein when an optical disc is inserted into the optical disc drive, information is coded from the optical disc drive to a first device, a part of region of the first device is treated as a second device, being the virtual device, and it is noticed to said external interface that said second device is connected with said recording/reproducing apparatus, when said copying is completed,
    wherein said external interface portion is in accordance with a serial ATA standard, and said storage controller portion executes control of a port multiplier function of the serial ATA standard, in such a manner that said virtual device controller portion is recognized as one of device ports of the port multiplier; and
    wherein plural numbers of the second devices are produced.

2. The recording/reproducing apparatus, as is described in the claim 1,
    wherein Data of a part of region of said first device is deleted, when a request for ejecting said second device is made from said external apparatus.

3. The recording/reproducing apparatus, as is described in the claim 1,
    wherein said second device is controlled as an optical disc for exclusive use of reading.

4. The recording/reproducing apparatus, as is described in the claim 1,
    wherein at least one other device of said plural number of devices is a hard disc drive.

5. The recording/reproducing apparatus, as is described in the claim 1,
    wherein at least one other device of said plural number of devices is a solid state drive.

6. The recording/reproducing apparatus, as is described in the claim 1,
    wherein said storage controller portion deletes data of said first device, which is already copied, and the virtual device controller portion cancels connection of said second device, upon a vender unique command in accordance with the serial ATA standard from an apparatus connected to said external interface portion.

7. The recording/reproducing apparatus, as is described in the claim 1,
    wherein said storage controller portion deletes data of said first device, which is already copied, and said virtual device controller portion cancels connection of said second device, when a request of removing said second device is issued from said external apparatus.

8. The recording/reproducing apparatus, as is described in the claim 1,
    wherein said second device is maintained even when said recording/reproducing apparatus is connected with an external apparatus other than said external apparatus.

9. The recording/reproducing apparatus, as is described in the claim 1,
    wherein the optical disc drive and the second device are recognized as device ports of the port multiplier in parallel.

* * * * *